W. C. & A. J. JONES.
WIRE STRETCHER.
APPLICATION FILED JUNE 13, 1914.
1,115,436.
Patented Oct. 27, 1914.
2 SHEETS—SHEET 1.
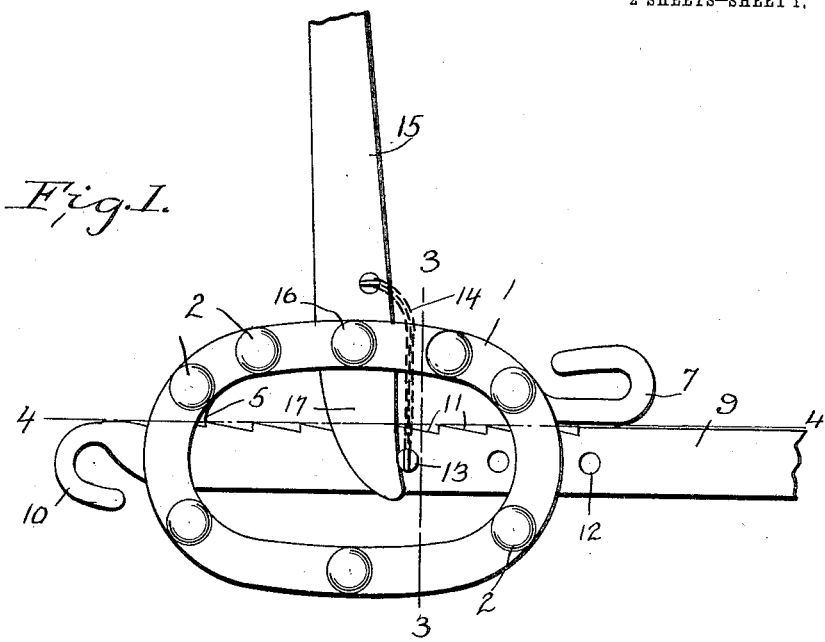
Fig. 1.
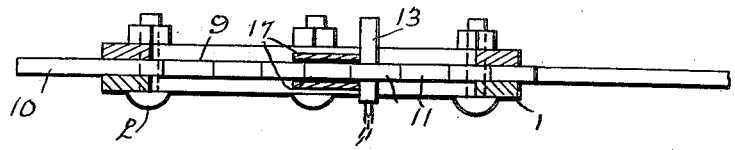
Fig. 4.
Fig. 5.
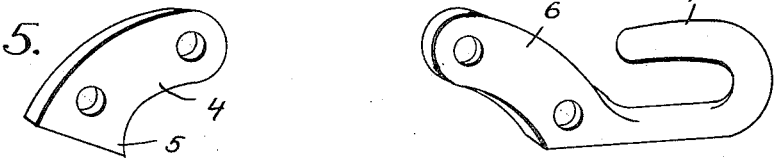
Fig. 6.
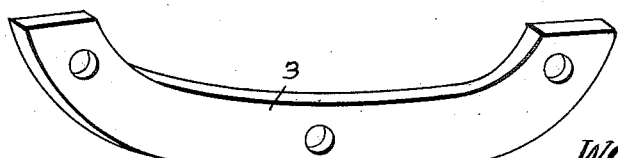
Fig. 7.
Witnesses
R. M. Jones.
Wm. S. Fowler.
Inventors
W. C. Jones.
A. J. Jones.
By
Attorney

W. C. & A. J. JONES.
WIRE STRETCHER.
APPLICATION FILED JUNE 13, 1914.

1,115,436.

Patented Oct. 27, 1914.
2 SHEETS—SHEET 2.

Witnesses

Inventors
W. C. Jones
A. J. Jones

UNITED STATES PATENT OFFICE.

WILLIAM C. JONES AND ALBERT J. JONES, OF MAGEE, MISSISSIPPI.

WIRE-STRETCHER.

1,115,436.

Specification of Letters Patent. Patented Oct. 27, 1914.

Application filed June 13, 1914. Serial No. 844,992.

*To all whom it may concern:*

Be it known that we, WILLIAM C. JONES and ALBERT J. JONES, citizens of the United States, residing at Magee, in the county of Simpson and State of Mississippi, have invented certain new and useful Improvements in Wire-Stretchers, of which the following is a specification.

This invention comprehends certain new and useful improvements in wire stretchers and has for its primary object to provide a device of this character which will be of extremely simple construction and operation, as well as highly efficient in use and strong and durable.

Another object of the invention is to provide a device of this character which will be constructed in such manner that the parts may be readily assembled and secured together and the device used for stretching wire strands or wire fabrics, as desired.

Another object of the invention is to provide a wire stretcher of this character in which will be included a stationary pawl for engagement with the rack teeth of the slidable members adapted for longitudinal movement through the supporting and guiding frames.

This invention has for a still further object to generally improve and simplify the construction and operation of the various parts of the device and increase the efficiency thereof without materially increasing the cost of the same.

With these and other objects in view as will become more apparent as the description proceeds, the invention consists in certain novel features of construction, combination and arrangement of parts as will be hereinafter more fully described and claimed.

For a complete understanding of our invention, reference is to be had to the following description and accompanying drawings, in which—

Figure 3:
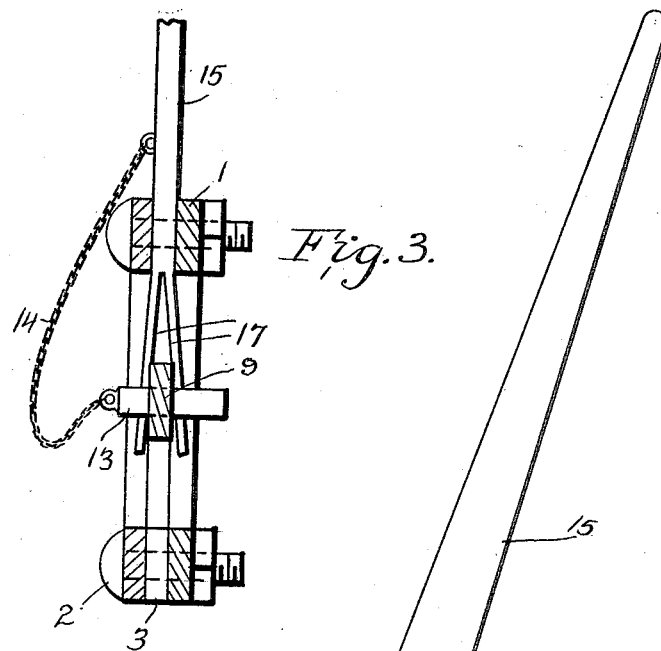
Figure 2:
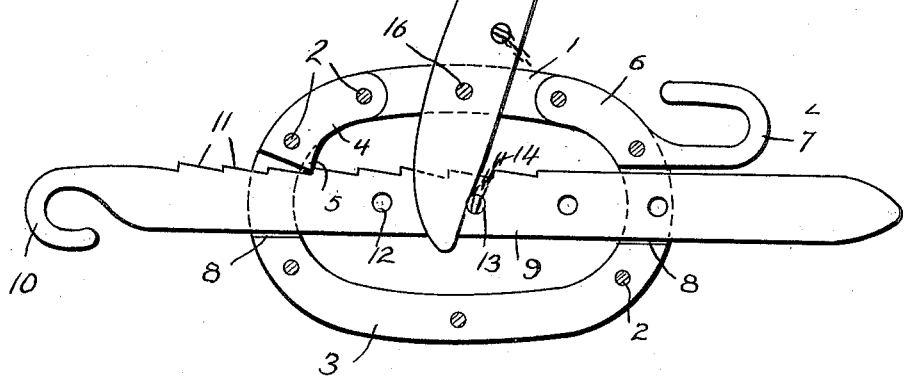

Figure 1 is a side elevation of the complete device, Fig. 2 is a view similar to Fig. 1, with one of the rings of the frame removed, Fig. 3 is a transverse section on the plane of line 3—3 of Fig. 1, Fig. 4 is a detail longitudinal section, on the plane of line 4—4 of Fig. 1, Fig. 5 is a detail perspective view of the stationary pawl removed, Fig. 6 is a detail perspective view of the frame hook removed, and Fig. 7 is a detail perspective view of the curved guide member removed.

Referring more particularly to the drawings in which similar reference characters designate corresponding parts throughout the several views, 1 designates a pair of elliptical frame members which are positioned parallel to one another and connected by the bolts 2. The frame members 1 are retained in spaced relation by the curved spacing member 3 and also by the stationary pawl 4 having an inwardly directed tooth 5 and by the body 6 of the hook 7 positioned between said elliptical frame members 1. It will be understood that the curved portion or main portion of the hook 7 extends outwardly from one end of the body formed by the members 1, and the pawl 4 is positioned at the opposite end of the frame. The hook 7 and pawl 4 are preferably to one side of the frame, however, while the curved spacing member 3 is positioned upon the opposite side of said frame, and the opposite ends of said member frame, and the opposite ends of said member 3 are spaced from the pawl 4 and hook 7, respectively, thereby providing the opposite guide openings 8 at the opposite ends of the frame, through which is slidably engaged the draw bar 9, having a hook 10 formed on its forward end for engagement with the wire to be stretched, while the rack teeth 11 are formed along one longitudinal edge of said draw bar 9 for engagement with the tooth 5 of the stationary pawl 4 to lock the draw bar 9 against forward movement.

It will be understood that the hook 7 is connected with a wire or the like, not shown, connected with a stationary post, which it is desired to stretch or draw the wire strand or wire mesh of a fence by connecting the same with the hook 10 and the forward end of the draw bar 9 and properly operating the device. The draw bar 9 is provided with a row of perforations 12 extending longitudinally thereof and within which may be removably engaged a pin 13 carried upon the free end of a chain 14, which is secured to the rocking lever 15 which is mounted upon the pivot pin 16 extending transversely through the frame members 1 between the stationary pawl 4 and the body 6 of the hook 7. The inner end 17 of the rocking lever 16 is bifurcated for engagement upon opposite sides of the draw bar 9 and against the front face of opposite portions of the pin 13 projecting to opposite sides of the draw bar 9 when said pin 13 is in position in one of the perforations 12, whereby upon forward movement of the outer end of the rocking lever 15, said lever will be swung upon the pivot pin 16 to move the bifurcated end 17 of said lever rearwardly and thereby force the pin 13 and draw bar 9 rearwardly, compelling the draw bar 9 to slide through the guide slots 8 in the opposite ends of the frame and draw the wire connected with the hook 10 toward the frame.

It will be readily seen that the tooth 5 of the stationary pawl 4 will be, during movement of the lever 15 rearwardly, forced into engagement with the rack teeth 11 and catch each of the teeth in turn as they pass said pawl, and as soon as the lever is moved in the opposite direction, the tooth 5 of the pawl 4 will catch the adjacent tooth 11 and prevent forward movement of said draw bar 9. The pin 13 may then be removed and engaged in a perforation 12 near the forward end of the draw bar 9, and the above described operation of the rocking lever 15 repeated and this may be continued until the wire is stretched to the desired tension and securely fastened against movement, when the wire stretcher may be disconnected from the stretched wire and the stationary support, as will be readily understood. It will further be evident that owing to the construction and operation of the various parts of this device and the manner in which said parts are connected, the stretcher may be readily and cheaply constructed and the parts easily assembled, and should said parts become worn or broken, they may be readily replaced at a small cost.

While we have shown and described the preferred embodiment of our invention, it will be understood that minor changes in the details of construction, combination and arrangement of parts may be made without departing from the spirit and scope of the invention as claimed, or sacrificing any of the advantages thereof.

What is claimed is:—

1. A device of the class described comprising a frame having a stationary pawl and opposite guide slots, said pawl being positioned adjacent one of said guide slots, a hook carried by said frame to connect the latter with a stationary member, a draw bar slidably engaged through the guide slots of the frame and having teeth formed along one edge, said draw bar having a hook formed upon one end for engagement with a member to be stretched, a pin removably engaged through said draw bar, said pawl being engaged with said teeth, and means for engagement with the pin to force the draw bar in one direction through said frame, said pawl being adapted to prevent movement of the draw bar in the reverse direction.

2. A device of the class described comprising a frame including a pair of elliptical frame members, a spacing member positioned between said elliptical frame members, a stationary pawl positioned between said elliptical frame members, a securing hook positioned between said frame members, a draw bar slidably engaged between the frame members, means for connecting the frame members and securing in position the spacing and guide members, said last mentioned means also serving to secure in position the stationary pawl and the hook, said draw bar being provided with a hook on one end and teeth along one face, said stationary pawl being engaged with said teeth to prevent movement of said draw bar in one direction, a pin removably engaged through said draw bar, a bifurcated rocking lever secured in said frame between the hook and the stationary pawl carried by said frame and adapted for engagement with the removable pin to force the draw bar in a reverse direction.

3. A device of the class described comprising a frame including spaced members, means for securing together said spaced members, a pawl positioned between said spaced members, and means for securing together the spaced members and the pawl; in combination with a draw bar slidably engaged between the spaced members, a pin removably engaged through said draw bar, said draw bar having teeth formed along one edge, said pawl being engaged with said teeth to prevent forward movement of the draw bar, and a rock lever pivoted between said spaced members and having a bifurcated end for engagement upon opposite sides of the draw bar and engagement against the pin to force the draw bar rearwardly upon operation of said rock lever.

In testimony whereof we affix our signatures in presence of two witnesses.

WILLIAM C. JONES.
ALBERT J. JONES.

Witnesses:
R. W. BREWER,
E. H. COOK.

---

Copies of this patent may be obtained for five cents each, by addressing the "Commissioner of Patents, Washington, D. C."